United States Patent Office 2,732,368
Patented Jan. 24, 1956

2,732,368
TYPE III PHENOLIC RESINS AND THEIR PREPARATION

Alvin F. Shepard, Le Roy, N. Y., assignor to Hooker Electrochemical Company, Niagara Falls, N. Y., a corporation of New York No Drawing. Application December 18, 1952,
Serial No. 326,782

12 Claims. (Cl. 260—53)

This invention relates to those reaction products of a 3,5-substituted phenol with an aldehyde which remain permanently fusible and soluble (in acetone or benzene) when heated, even in the presence of aldehyde in addition to that proportion initially used in preparing these products and to a method of preparing the same.

The terms "resite" and "resol" as used herein have the meanings as defined by Carleton Ellis in "The Chemistry of Synthetic Resins" (Reinhold Publishing Corp., New York, N. Y., 1935) page 315, namely:

"1. A resol is a resin of the type hardenable by heat to a final insoluble and infusible condition, but reacted only to the stage where it still melts when heated. . . .

"2. A resite is the same heat-hardenable resin, but reacted to the final or C stage characterized by complete insolubility in acetone and infusibility without any material softening upon heating."

Since 3,5-substituted phenols have no substituents in 2-, 4- and 6-positions, they are classified as Type III phenols according to the conventional classification system which is described in "The Chemistry of Commercial Plastics" (Reinhold Publishing Corp., New Cork, N. Y., 1947), by R. L. Wakeman; pages 121–123. As Type III phenols, the 3,5-substituted phenols should react with aldehydes in various ways to yield fully cured resites. Furthermore, the 3,5-substituted phenols should combine with formaldehyde in an alkaline medium under mild conditions to give resols. The formation of resols from all Type III phenols is particularly expected since Hönel in U. S. Patent 2,165,380 describes resols made in the aforesaid manner from for example, 3,5-dimethylphenol; 3,5-diethylphenol; and 3-methyl-5-isopropylphenol.

The discovery, however, of a reaction product of an aldehyde and a 3,5-substituted phenol which is not a resol would be of value in a number of ways. For example, thermoplastic phenolic resins of high melting point are desirable as is well known for incorporation in drying oils, waxes and rubbers to increase hardness. When ordinary Type III phenols or even when para-substituted (Type II) phenols as indicated by Hönel in U. S. Patents 1,996,070, 2,012,278 and 2,049,047 are used, the aldehyde reaction products may become insoluble and infusible.

Accordingly, it is a principal object of the present invention to produce a reaction product of an aldehyde and a 3,5-substituted phenol which, although expected to be infusible and insoluble or capable of being rendered infusible and insoluble by heating, nevertheless, remains permanently fusible and soluble (in acetone or benzene) when heated, even in the presence of aldehyde in addition to the proportion initially used in preparing the original reaction product.

A further object of this invention is to produce a 3,5-substituted phenol-aldehyde resin which notwithstanding its ability to remain permanently fusible and soluble, nevertheless possesses reactivity towards substances such as other simple phenolic resins, polyene, and polydiene rubbery polymers.

These and other objects and advantages will become more apparent from the following detailed description.

I have discovered that the new compound, 3,5-diisopropylphenol, although a Type III phenol, does not form resites when heated with a molecular excess of an aldehyde and an acid catalyst but instead forms fusible resins which are readily soluble in acetone or benzene. Similarly, the reaction of 3,5-diisopropylphenol with somewhat less than the molecular equivalent of an aldehyde in an acid medium gives a fusible resin resembling a typical novolak. But unlike a novolak, made for example, from phenol, meta-cresol, 3,5-dichlorophenol or the like, the fusible resin from 3,5-diisopropylphenol does not become thermosetting when mixed with such curing agents as hexamethylenetetramine or paraformaldehyde. Moreover, while 3,5-diisopropylphenol combined with up to about 2 molecular equivalents of formaldehyde under mild conditions such as used by Hönel in making the resols of U. S. Patent 2,165,380, the products so obtained are not resols. The products are instead permanently fusible resins which may undergo some change in melting point or viscosity when heated, but which remain fusible and soluble in acetone.

The compound, 3,5-diisopropylphenol and a method of producing the same form the subject matter of my copending United States application Serial No. 326,783, filed December 18, 1952.

The exact theoretical explanation for the inability of 3,5-diisopropylphenol to form a resol when reacted with an aldehyde is not known. It is however, now suggested that the 4-position is blocked by the bulkiness of the branched substituents in the 3- and 5-positions as can be demonstrated by the use of the Fisher-Taylor-Hirschfelder molecular models of United States Patent No. 2,308,402.

Reaction products containing free methylol groups (for instance, resins containing a proportion of combined aldehyde to 3,5-diisopropylphenol greater than 1 to 1) are very reactive and may react through the methylol group with another phenol resin or with a polyene or polydiene polymer such as rubber to cross-link. Reaction products containing more than one methylol group per molecule have the ability to cross-link such substances.

The 3,5-diisopropylphenol reactant of this invention may be produced by the liquid phase oxidation of 1,3,5-triisopropylbenzene in the presence of an alkaline catalyst to form 1,3,5-triisopropylbenzene mono-hydroperoxide. The latter compound may in turn be cleaved in the presence of a minor proportion of acid to form 3,5-diisopropylphenol and acetone. This method is described more fully in the above referred to copending application. The present invention, however, is not limited to the use of 3,5-diisopropylphenol made by this method since 3,5-diisopropylphenol made by any other method would be equally satisfactory.

Any of the aldehydes used for producing known phenolic aldehyde resins are suitable for this invention. For example, aldehydes such as formaldehyde, benzaldehyde, crotonaldehyde, furfural and acetaldehyde are suitable aldehydes.

Although the reaction of the selected aldehyde and 3,5-diisopropylphenol will proceed at room temperature, e. g. 25° C. or below, higher temperatures, e. g. up to about 200° C. may be employed.

The reaction between an aldehyde and 3,5-diisopropylphenol will proceed in the absence of a catalyst. It is preferred however, to use an acid or alkaline catalyst as commonly used in other known phenol-aldehyde condensation reactions. Examples of such catalysts include sulfuric acid, hydrochloric acid, phosphoric acid, oxalic acid, sodium, potassium, and calcium hydroxides and quaternary ammonium hydroxides.

Although the ordinary Type III phenols when reacted with aldehydes produce products which are insoluble and infusible, the reaction product of 3,5-diisopropylphenol with an aldehyde is soluble and fusible and resins with melting points higher than 160° C. are easily prepared. These products are fusible even though a molecular excess of aldehyde, i. e., a molecular ratio of aldehyde to phenol greater than 1 to 1 be used. They are comparatively light colored and resistant to discoloration by heat and light. The color stabiilty may perhaps be attributed to the large proportion of aldehyde which may be combined with the 3,5-diisopropylphenol without rendering the product insoluble and infusible. Such high melting resins from 3,5-diisopropylphenol are readily soluble in or miscible with most common organic solvents, drying oils, waxes, gums, resins and plasticizers and they can be used in varying proportions to increase the hardness of air-drying varnishes, waxes and other organic compositions.

The lower melting point products including those made by the reaction of 3,5-diisopropylphenol with less than one molecular equivalent of aldehyde are likewise comparatively light colored and highly compatible with other materials. These lower melting products containing less than one molecular equivalent of aldehyde are valuable for incorporation in thermosetting phenolic resin compositions such as molding compounds where their limited reactivity toward paraformaldehyde and hexamethylenetetramine renders them valuable as plasticizers.

Products made by alkaline reaction of 3,5-diisopropylphenol with a molecular excess of formaldehyde under mild conditions exhibit strong reactivity toward other substances. These materials although remaining entirely fusible and soluble when heated alone can serve as curing agents. Thus, for example, a resin made by reaction of 1 mol of 3,5-diisopropylphenol with a large excess of formaldehyde (e. g. 3.3 mols formaldehyde to 1 mol of 3,5-diisopropylphenol) in the presence of sodium hydroxide remains fusible and acetone-soluble and benzene-soluble after prolonged heating at 165° C. The same resin mixed with a simple phenol-formaldehyde novolak gives an insoluble infusible product on heating for about 1 minute at 165° C. These reactive resins also may be heated with drying oils, waxes, gums and the like to yield harder and more durable compositions.

Examples 1, 3, 4, 6 and 9 are presented hereinafter to illustrate the new and novel reaction products of the present invention. Examples 2, 5, 7 and 8 are presented for the purpose of illustrating conventional resols or resites obtained by using 3,5-substituted phenols other than 3,5-diisopropylphenol and for comparing them with the resins of the present invention.

*Example 1*

25.0 grams (0.14 mole) of 3,5-diisopropylphenol, 17.0 grams (0.21 mole) of formaldehyde (37% by wt.), and 0.25 gram of 96% $H_2SO_4$ are mixed and boiled under reflux for 20 minutes. A viscous resin is obtained containing 0.14 mole of combined formaldehyde. The resin is neutralized with lime and the supernatant water layer decanted. It is then dehydrated in vacuum and a brittle resin having a melting point of 110° C. is obtained. It is soluble in acetone.

When heated further at 160–170° C. with common curing agents such as paraformaldehyde and oxalic acid or lime, or with hexamethylenetetramine, the resin becomes more viscous and higher melting but remains fusible and soluble in acetone or benzene.

*Example 2*

27.20 grams (0.20 mole) of 3,5-methylethyl phenol, 24.20 grams (0.30 mole) of formaldehyde (37% by wt.) and 0.27 gram of 96% $H_2SO_4$ are mixed and boiled under reflux for 20 minutes. A viscous resin is obtained containing 0.18 mole of combined formaldehyde. The resin is neutralized with lime and the supernatant water layer is decanted off. The resin is then dehydrated under vacuum and a brittle product having a melting point of 110° C. is obtained. It is soluble in acetone.

When heated further at 160–170° C. in the presence of oxalic acid and paraformaldehyde, the resin becomes infusible and will not dissolve in acetone.

*Example 3*

25.0 parts of 3,5-diisopropylphenol, 9.25 parts of acetaldehyde (1.5 moles aldehyde per mole of the phenol) and 0.50 parts of 96% $H_2SO_4$ are mixed and heated at 50–70° C. under reflux for six hours. The resultant resin is neutralized with lime and heated to 100° C. under 28 inches vacuum. A viscous liquid resin soluble in acetone is obtained.

This resin when heated at 160–170° C. with paraformaldehyde and oxalic acid or lime, or with hexamethylenetetramine becomes more viscous and yields resins which are solid when cold and which melt at various temperatures from 60° to 140° C. All these various resins are fusible and soluble in acetone or benzene.

*Example 4*

25.0 grams of 3,5-diisopropylphenol (0.14 mole), 6.80 grams (0.084 mole) of formaldehyde (37% by wt.) and 0.50 gram of oxalic acid are mixed and boiled under reflux for about 4 hours. The product is dehydrated under vacuum and then heated to 160–170° C. at atmospheric pressure. A resin is obtained having a melting point of 65° C. and containing about 0.081 mole of combined formaldehyde. It is soluble in acetone or benzene.

When heated at 160–170° C. with paraformaldehyde and oxalic acid or lime with hexamethylenetetramine, the above resin becomes more viscous and higher melting (80°–145° C. but remains fusible and is soluble in acetone or benzene.

*Example 5*

32.60 grams of 3,5-dichlorophenol (0.2 mole), 9.73 grams (0.12 mole) of formaldehyde (37% by wt.) and 0.65 gram of oxalic acid are mixed and boiled about 2 hours. The resin is then dehydrated under vacuum and then heated to 160–170° C. at atmospheric pressure. The product has a melting point of 50–55° C. and contains 0.119 mole of combined formaldehyde. It is soluble in acetone.

When heated at 160–170° C. with paraformaldehyde and oxalic acid or lime, or with hexamethylenetetramine, the above resin is converted to an infusible mass which is insoluble in acetone.

*Example 6*

534 grams of 3,5-diisopropylphenol (3 moles), 304 grams (3.75 moles) of formaldehyde (37% by wt.), and 5.3 grams of sodium hydroxide are mixed and boiled under reflux for 1 hour until the mix contains less than 0.5% unreacted $CH_2O$. It is then dehydrated under vacuum. The product is a solid resin having a capillary melting point of 105° C. and is soluble in acetone or benzene.

*Example 7*

30.0 grams of symm.m-xylenol (0.246 mole), 90 grams (1.11 mole) of formaldehyde (37% by wt.) and 3.0 grams of sodium hydroxide are combined while cooling. The clear solution is allowed to stand five days at room temperature. A solid resin gel of clear amber color is obtained which is infusible and insoluble in acetone.

*Example 8*

27.20 grams of 3,5-methylethyl phenol (0.20 mole), 53.40 grams (0.66 mole) of formaldehyde (37% by wt.), and 2.70 grams of sodium hydroxide are mixed while cooling. The clear solution is allowed to stand for seven days at room temperature. The condensation product is an infusible resin gel of clear amber color containing about 0.50 mole of combined formaldehyde. This resin is insoluble in acetone and benzene.

*Example 9*

35.6 grams of 3,5-diisopropylphenol (0.2 mole), 53.4 grams (0.66 mole) of formaldehyde (37% by wt.) and 3.6 grams of sodium hydroxide are combined while cooling and allowed to stand for seven days at room temperature, i. e. 25° C. A solid opaque resin is obtained containing 0.4 mole of combined formaldehyde. This resin is soluble in acetone or benzene.

It becomes somewhat more viscous when heated yielding relatively light colored products having capillary melting points as high as 180° C. These high melting resins are soluble in either acetone or benzene.

The unheated resin may also be neutralized, for example with hydrochloric acid, and washed with water to remove the resulting salt. The product freed of salt has properties very similar to the unneutralized resin.

I claim:

1. The reaction product of 3,5-diisopropylphenol and an aldehyde, said reaction product containing more than 1 mol of combined aldehyde per mol of 3,5-diisopropylphenol and being permanently fusible and soluble.

2. The reaction product of 3,5-diisopropylphenol and an aldehyde selected from the group consisting of formaldehyde, benzaldehyde, crotonaldehyde, furfural and acetaldehyde, said reaction product containing more than 1 mol of combined aldehyde per mol of 3,5-diisopropylphenol and being permanently fusible and soluble.

3. The reaction product of 3,5-diisopropylphenol and formaldehyde, said reaction product containing more than 1 mol of combined formaldehyde per mol of 3,5-diisopropylphenol and being permanently fusible and soluble.

4. The alkaline catalyzed reaction product of 3,5-diisopropylphenol and an aldehyde, said reaction product containing more than 1 mol of combined aldehyde per mol of 3,5-diisopropylphenol and being permanently fusible and soluble.

5. The alkaline catalyzed reaction product of 3,5-diisopropylphenol and an aldehyde selected from the group consisting of formaldehyde, benzaldehyde, crotonaldehyde, furfural, and acetaldehyde, said reaction product containing more than 1 mol of combined aldehyde per mol of 3,5-diisopropylphenol and being permanently fusible and soluble.

6. The alkaline catalyzed reaction product of 3,5-diisopropylphenol and formaldehyde, said reaction product containing more than 1 mol of combined formaldehyde per mol of 3,5-diisopropylphenol and being permanently fusible and soluble.

7. The method of preparing a Type III phenol resin which is permanently fusible and soluble which comprises forming by condensation a reaction product of 3,5-diisopropylphenol and an aldehyde containing more than 1 mol of combined aldehyde per mol of 3,5-diisopropylphenol.

8. The method of preparing a Type III phenol resin which is permanently fusible and soluble which comprises forming by condensation a reaction product of 3,5-diisopropylphenol and an aldehyde selected from the group consisting of formaldehyde, benzaldehyde, crotonaldehyde, furfural, and acetaldehyde containing more than 1 mol of combined aldehyde per mol of 3,5-diisopropylphenol.

9. The method of preparing a Type III phenol resin which is permanently fusible and soluble which comprises forming by condensation a reaction product of 3,5-diisopropylphenol and formaldehyde containing more than 1 mol of combined formaldehyde per mol of 3,5-diisopropylphenol.

10. The method of preparing a Type III phenol resin which is permanently fusible and soluble which comprises forming by condensation in the presence of an alkaline catalyst a reaction product of 3,5-diisopropylphenol and an aldehyde containing more than 1 mol of combined aldehyde per mol of 3,5-diisopropylphenol.

11. The method of preparing a Type III phenol resin which is permanently fusible and soluble which comprises forming by condensation in the presence of an alkaline catalyst a reaction product of 3,5-diisopropylphenol and an aldehyde selected from the group consisting of formaldehyde, benzaldehyde, crotonaldehyde, furural and acetaldehyde containing more than 1 mol of combined aldehyde per mol of 3,5-diisopropylphenol.

12. The method of preparing a Type III phenol resin which is permanently fusible and soluble which comprises forming by condensation in the presence of an alkaline catalyst a reaction product of 3,5-diisopropylphenol and formaldehyde containing more than 1 mol of combined formaldehyde per mol of 3,5-diisopropylphenol.

References Cited in the file of this patent

FOREIGN PATENTS

| | | |
|---|---|---|
| 503,546 | Belgium | June 15, 1951 |
| 503,548 | Belgium | June 15, 1951 |
| 503,549 | Belgium | June 15, 1951 |